(12) United States Patent
Williams

(10) Patent No.: US 6,435,293 B1
(45) Date of Patent: Aug. 20, 2002

(54) AIR CONDITIONED CART

(76) Inventor: Robert Williams, 3650 Old Shell Rd., Mobile, AL (US) 36608

( * ) Notice: Subject to any disclaimer, the term of this patent is extended or adjusted under 35 U.S.C. 154(b) by 0 days.

(21) Appl. No.: 09/496,101

(22) Filed: Feb. 1, 2000

Related U.S. Application Data

(60) Provisional application No. 60/151,179, filed on Aug. 27, 1999, and provisional application No. 60/157,976, filed on Oct. 6, 1999.

(51) Int. Cl.$^7$ ............................... B60K 1/00; B60H 1/32
(52) U.S. Cl. ......................... 180/65.1; 62/244; 62/323.3
(58) Field of Search .................. 280/DIG. 5; 180/65.1, 180/65.2, 65.3, 65.4, 2.2; 62/244, 285, 419, 323.3, 323.1; 261/27

(56) References Cited

U.S. PATENT DOCUMENTS

| | | | | |
|---|---|---|---|---|
| 3,367,438 A | * | 2/1968 | Moore | 180/65.1 |
| 4,438,342 A | * | 3/1984 | Kenyon | 290/45 |
| 4,489,242 A | * | 12/1984 | Worst | 307/10 |
| 4,835,982 A | * | 6/1989 | Ferdows | 62/239 |
| 5,112,535 A | * | 5/1992 | Roberson | 261/27 |
| 5,305,613 A | * | 4/1994 | Hotta et al. | 62/209 |
| 5,467,006 A | * | 11/1995 | Sims | 320/22 |
| 5,613,371 A | * | 3/1997 | Nelson | 62/244 |
| 5,806,617 A | * | 9/1998 | Yamaguchi | 180/65.2 |

FOREIGN PATENT DOCUMENTS

| | | | | |
|---|---|---|---|---|
| DE | 3732869 A | * | 4/1989 | 180/65.4 |
| JP | 57182524 | * | 11/1982 | 180/65.3 |

* cited by examiner

Primary Examiner—Brian L. Johnson
Assistant Examiner—Gerald Klebe

(57) ABSTRACT

A cart sealed for cooling having a battery powered electrical drive including an electrically powered mechanical air conditioner, a generator for powering the air conditioner, an outside power outlet powered by the generator, and a battery charger powered by the generator. The generator is wired to the charger to recharge the batteries for the cart when power requirements of the other units allow. There is an insulated case for the generator and a muffler-baffle system for quieting the exhaust from the generator through a series of baffles. A separate fuel supply for the generator is provided so the generator does not drain the motive drive fuel. A misting unit may be used to control the moisture level in the interior of the cart. A control panel in the interior of the compartment is used for controlling the generator, the air conditioner or both. A system of recirculating ducts insures that air within the interior of the cart is run through the air conditioning unit and then returned to the cart interior after it has been cooled so that recirculating air and not exterior air is cooled or heated depending on the setting of the air conditioning unit.

14 Claims, 22 Drawing Sheets

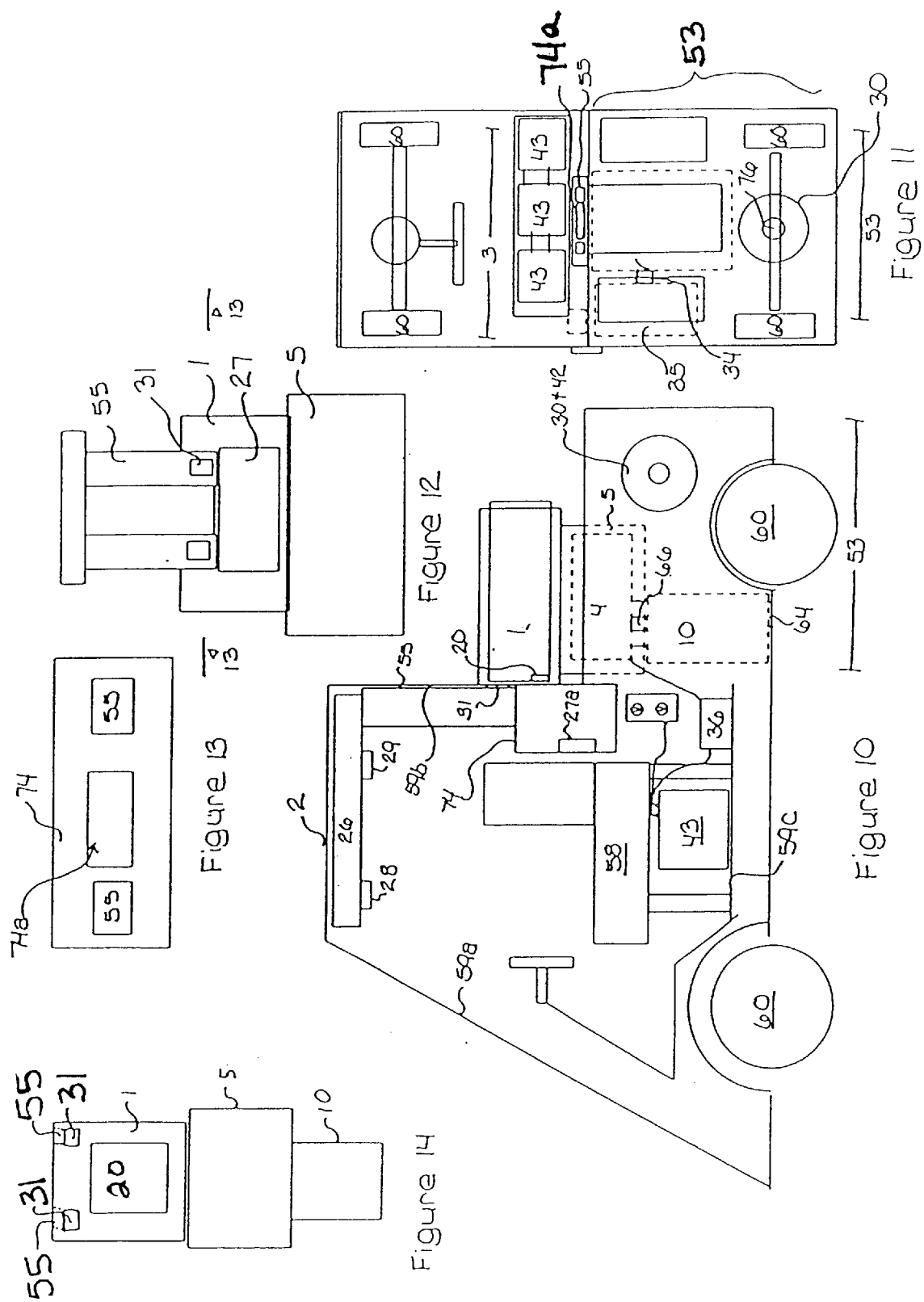

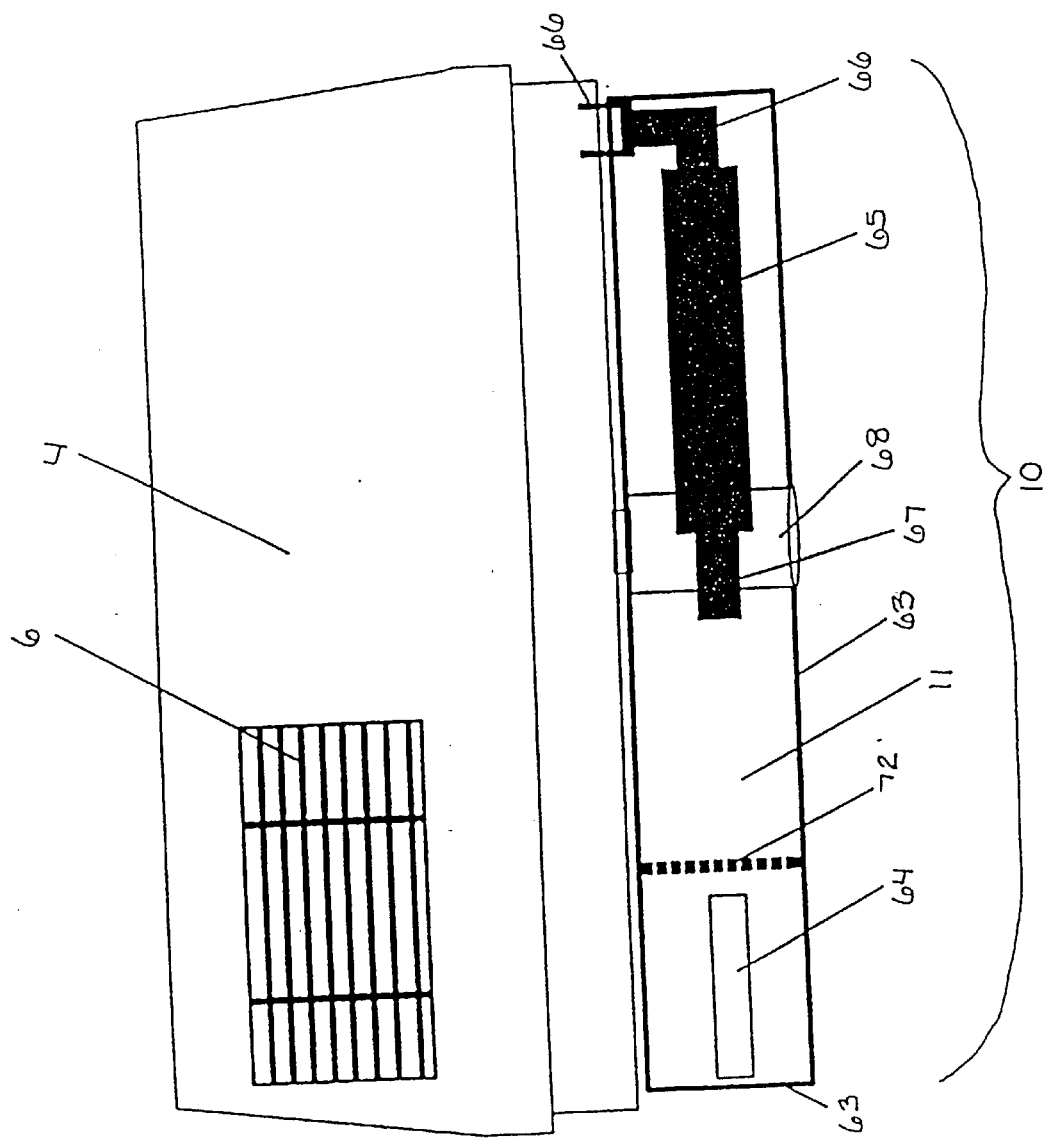

AIR CONDITIONED CART

PRIORITY APPLICATION

This is a continuation in part of:
application Ser. No. 60/151,179 filed Aug. 27, 1999 and
application Ser. No. 60/157,976 filed Oct. 6, 1999

BACKGROUND OF INVENTION

1. Field of Invention

The present invention relates to utility carts. More particularly, the invention relates to utility carts having multiple power sources. More particularly, the invention relates to golf carts having a temperature controlling device powered separately, preferably using a gas generator with the ability to charge a battery powered cart and provide power to an exterior socket.

2. Prior Art

Vehicles having air conditioning are known. An example of a cart with a cooling device is Roberson 5,112,535 which teaches a rooftop evaporative cooling system versus a mechanical air conditioning system.

These small carts are typically used as golf carts or as maintenance carts or for transportation in controlled environments such as amusement parks, hospitals and similar building complexes.

This patent also discusses the power supplies for these carts, often golf carts.

The inventive concept within the Roberson patent is having a water cooled air evaporator along with a blower means for putting the water into the interior of a cart and an interruption means for stopping the air flow when the cart was not level as is typically the case in a golf cart.

Another example of a rooftop mounted evaporative water cooling system can be found in U.S. Pat. No. 4,835,982 issued Jun. 6, 1989 to Ferdows.

This also describes blowers including ribs with attachments for mounting in space relation to the roof, and internal frames in the housing defining supports cooperating with the ribs to rigidly mount blowers in the housing.

One of the problems with the prior art has to do with fact that the structure has not been set out which allows for sufficient cooling in small carts which also need to have adequate carrying capacity for the use intended.

In addition the water cooled models are dependent on the moisture content in the surrounding air in order to function adequately and hence they have been inadequate to the job for which they are intended in different environments.

In addition with electrical golf carts there is not enough power in order to maintain a closed mechanical air conditioning unit which utilizes evaporating coils in order to generate cooling such as Freon (R-12) or Non-Dichlorodifluoromethan (R-134A).

To address this problem, the present invention presents a novel method for providing a closed circuit mechanical cooling system. In a golfing environment and in many hospital environments and other locations where this invention would be utilized, noise is a factor and hence the present invention is designed in such a way that noise would be minimized.

General Discussion of the Invention

The invention is generally described as a small motor driven cart having a separate power supply from the drive unit for powering a mechanical air conditioning unit. This separate power supply, in the preferred embodiment, is more specifically a gas powered generator. This generator powers receptacles for tools as well as an air conditioning or heating unit which may be located a various locations relative to the cabin or interior of the cart.

In order to make this function adequately in dry environments a sprayer may be incorporated into the unit so that a mist is circulated within the cart to raise the evaporation level.

A novel layout is described which maximizes the payload area of the golf cart and eliminates center of gravity problems presented by the prior art. The power source is designed to provide more utility to the cart than has been previously available by taking advantage of the charger incorporated with the generator to provide power in a variety of settings.

In its most specific embodiment this application also describes a cart design which incorporates features for storing tools and devices (particularly those for golf such as a cover which locks over the golf bag to the support panel) as well as the power and duct requirements for efficiently using the cooling system. A number of sound retarding improvements are also taught.

The invention may utilize a single power source with a variety of options in order to insure that the air conditioner power source does not effect the ability of the golf cart to travel. One of these options would be to have means for discontinuing power to the air conditioning unit when the fuel reaches a certain level. One improvement would be to disable the air conditioner unit when the fuel reaches a predetermined level so that a single power source might be used without endangering the mobile features of the unit.

Where there is a single fuel source it is also possible to have a single motor providing power. This motor would be attached to a generator which would provide electrical power to the drive system, either with or without a set of batteries in between, and provide power directly to the air conditioning unit.

Since the motor may be an AC motor or a DC motor and since the air conditioner may be an AC unit or DC unit preferably there would be a AC to DC converter or DC to AC converter depending on the type of power given off by the generator in order to provide the appropriate current to each of the separate drive units, the drive system and/or batteries utilized by the drive system and the air conditioning or heating unit.

In order to maximize the sound muffling, a baffle system having a width less than the inner diameter of the rear axle as described. This system moves the exhaust within a series of baffled tunnels before exiting from the system below the cart in order to insure that as little sound as possible issues from the generator.

In the preferred embodiment, the generator also charges a series of batteries which are used to drive the cart. A switch is also provided in the generator which provides power to the air conditioner motor when cooling or heating is desired.

A power diverting (which may include a current rectifier) circuit may switch between the batteries or the generator at the election of the user or automatically in order to provide power where it is needed in the correct form.

A voltage regulator is utilized in charging the batteries and a voltage meter is utilized for two purposes. The first purpose is to display the charge on the batteries. The second purpose is to disconnect the charging means, if necessary, when the batteries are fully charged.

It may also switch off power to the external socket when the batteries reach a certain level and may disconnect power to the air conditioner generator in the event that the batteries are not maintaining a certain level of charge because of power demands of the air conditioning unit.

Typically additional power is available at sufficient quantities in the preferred embodiment because the generator must be a sufficient size to start the air conditioner but once started the air conditioner requires substantially less energy. Therefore the excess power from the generator may be used to charge the batteries providing power to the cart motor or it may power the external socket.

The voltage regulator may operate to automatically start the generator when the batteries drop below a certain level and run until they charge to a certain level, whether the air conditioner is used or not, in order to maintain the batteries at a sufficient charge to drive the cart.

In order to provide for a low center of gravity in one embodiment the generator and mechanical air conditioner are placed over the rear axle of the cart. Immediately above the generator is the air conditioning unit which has an intake and an exhaust opening one above the other, as is standard in many window units. This unit can be placed directly above the generator providing additional insulation for the noise generated by the generator.

The rear of the cart defines an opening through which air may pass from the inside of the cart into the intake of the air conditioning unit.

The air conditioner blower unit blows into an opening in an air distribution duct system immediately above the intake opening of the air conditioner. This distribution duct system is described in more detail below.

Both the air intake and the distribution duct system may be accessed through an opening through which a filter for the air into the air conditioner may be replaced or other maintenance provided.

The distribution duct system provides that air from the air conditioning is distributed on either side of the golf cart as well as the front and rear of the golf cart.

In dry environments a sprayer or other misting means may be included at the point where the air conditioning vents enter the cart or at another location in order to enhance the effectiveness of the cooling qualities of the dry air from the air conditioning unit.

It is therefore an object of the invention to provide a small cart which may be continuously air conditioned in any terrain without effecting the drive mechanism of the golf cart.

It is a further object of the invention to provide a gas powered generator for a cart to provide electrical service either to a battery charger or to a power socket or to a mechanical closed coil air conditioning unit in a small cart.

It is a further object of the invention to provide a relatively quiet, low cost and lightweight air conditioning unit for a small cart.

It is a further object of the invention to provide a cart which describes a pay load bed which includes retractable cover which may extend over an open container, such as a golf bag, adjacent to the pay load bed.

It is a further object of the invention to provide a mechanism which allows for an electric golf cart to be adapted to have sufficient power to run an air conditioning unit which may be located on top, at the side or adjacent to the golf cart.

It is a further object of the invention to provide an air conditioned motor driven cart which is sufficiently quiet so that it may be used in a golfing environment or in another environment where quiet is preferred.

It is a further object of the invention to provide a cart which has a sufficient power supply in order to power a compressor or other high power use circuit.

These and other objects and advantages of the invention will become better understood hereinafter from a consideration of the specification with reference to the accompanying drawings forming part thereof, and in which like numerals correspond to parts throughout the several views of the invention.

BRIEF DESCRIPTION OF DRAWINGS

For a further understanding of the nature and objects of the present invention, reference should be made to the following detailed description taken in conjunction with the accompanying drawings in which like parts are given like reference numerals and wherein:

FIG. 10 shows a transparent view of the port side cross section of an alternative view of the cart and air conditioning system in reference to FIG. 1.

FIG. 11 shows a top view of FIG. 10.

FIG. 12 shows a cross section of the unit in FIG. 10 through the 12—12 axis.

FIG. 13 shows the top view of the air intake and back duct in FIG. 12.

FIG. 14 shows the arrangement of the air conditioner and generator and baffle system from FIG. 10.

FIG. 15 shows a detailed view of the generator and baffle system of FIG. 10.

DETAILED DESCRIPTION OF THE PREFERRED EXEMPLARY EMBODIMENTS

Figure 1:
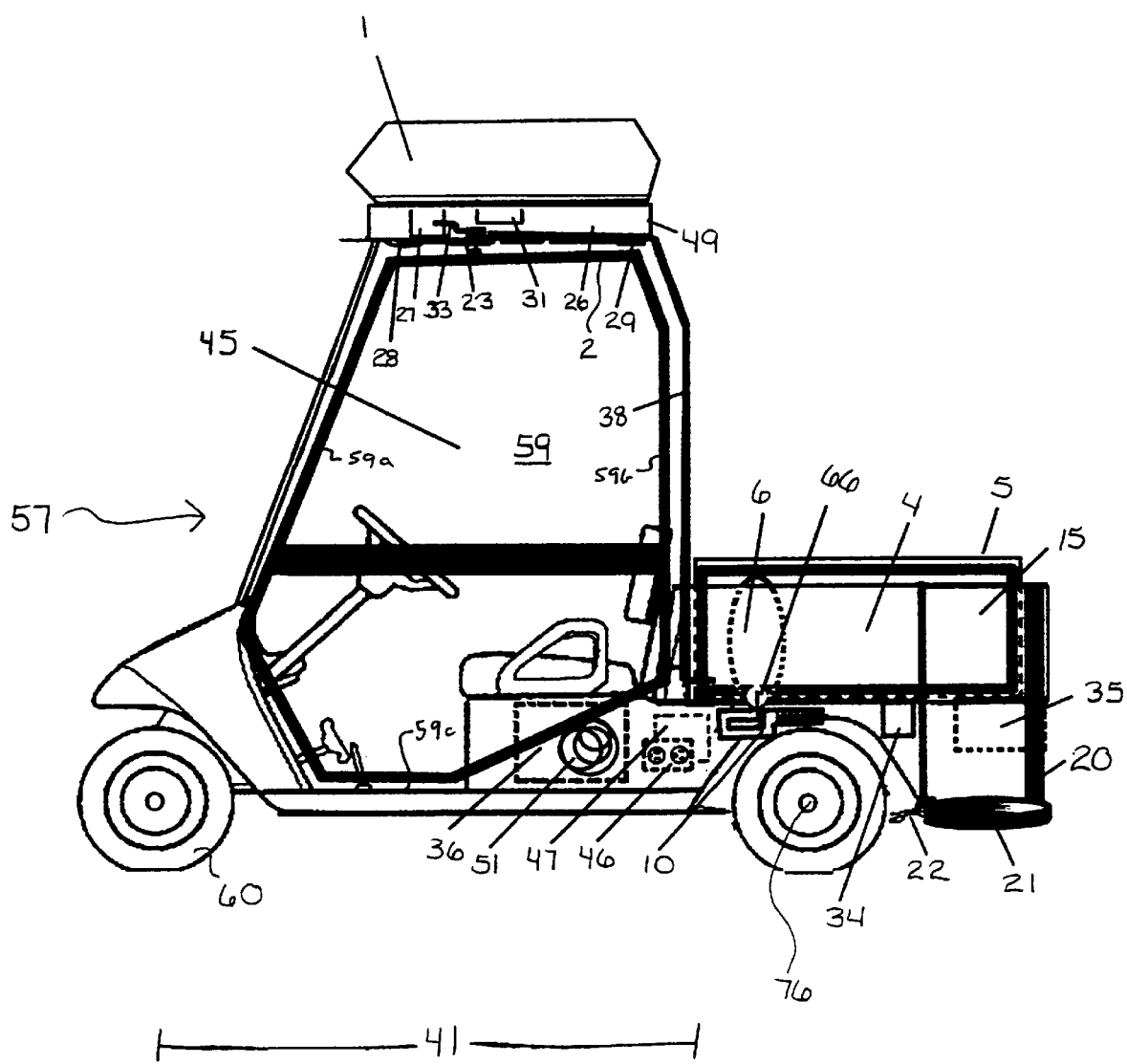
FIG. 1 shows a port side cross section of the cart and air conditioning system.

As can best be seen by reference to FIG. 1 the invention comprises a cart 57 having a roof 2 having a duct system and an enclosure 59 for a passenger. The enclosure includes doors 45 as well as windows which are known in the art. For purposes of clarifying the dual power system, FIG. 1 shows the air conditioning unit on the roof 2. This is typically not desirable because of center of gravity as described in more detail below.

The enclosure 59 comprises a roof 2 and doors 45. It has insulation 49 through which air ducts 31 pass from an air conditioning unit 1 into the enclosure 59 through the roof 2. These ducts 31 serve to provide air to the front 59a and rear 59b of the cart 57 and to allow return air from the enclosure 59 to the air conditioning unit 1. The ducts may also serve as baffles to reduce the noise from the air conditioning unit 1. The duct work 31 may have walls which provide for support of the roof 2 as well as channeling air. The air intake 27 allows internal air from the enclosure 59 into the air conditioning or heating unit 1. Air from the AC output 20 passes from inside the AC unit 1 to the duct work 20. The air then passes to the anterior vents 28 and posterior vents 29 to distribute air throughout the enclosure 59. The air conditioning unit is preferably a mechanical condensing unit having an integrated heating unit.

In order to provide proper power for this type of condensing unit a generator 4 is provided in a pay load bed 53. A power line 38 runs from the generator 4 to the air conditioner unit 1. The generator 4 is in a generator housing 5 which has internal insulation 9 and a muffler system 10 comprised of a muffler 65 and a baffle system 11 enclosing the muffler 65 to reduce noise.

The baffle system comprises at least one chamber partially separated by at least one wall which may have baffles 11 to separate the chamber so that the exhaust in channeled between the two portions of the chamber and further comprises at least one vent 64 below the cart through which the exhaust may exit the baffle system below the cart 57. A carbon dioxide or carbon monoxide filter may also be used to reduce emissions.

The housing 5 is preferably directly above the axle 76 of the cart 57 so that it does not interfere with the wheel clearance but also does not offset the center of gravity any more than necessary. This attention to the center of gravity is why in other embodiments, the air conditioning unit 1 is moved.

The generating housing 5 is surrounded either internally or externally with sound insulation 9 and also has a muffler system 10 so that it can continuously run with minimal disturbance of the surrounding environment. The air conditioner unit 1 may have a housing similarly equipped. The baffle system 10 is described separately below.

A mechanical air conditioning unit 1 uses a large unit of with energy to start and then it's power requirements are greatly reduced.

Figure 9:
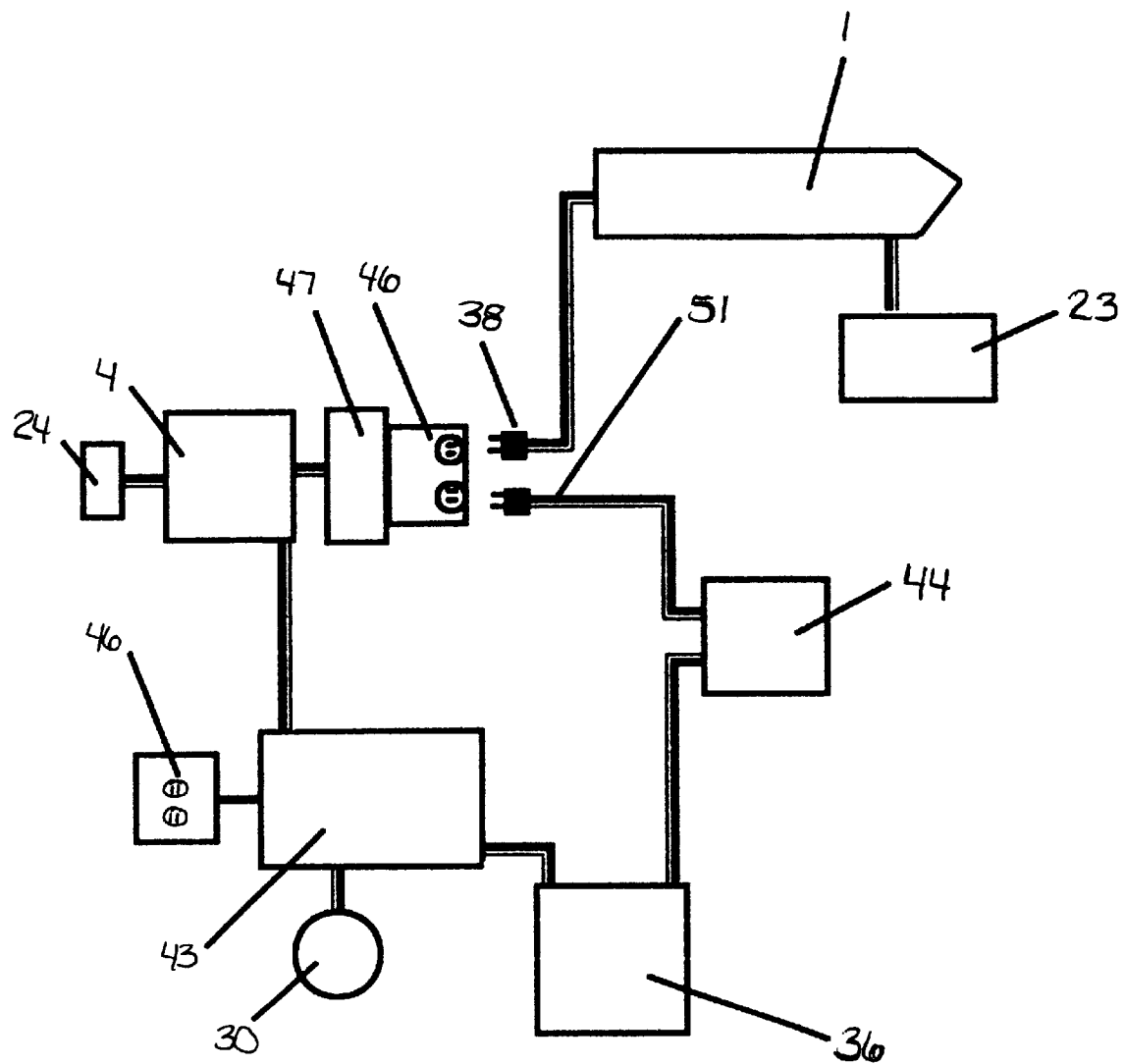
FIG. 9 shows an electrical block diagram of the air conditioning and generator units described in reference to FIG. 1.

Because the generator 4 generates a sufficient amount of energy to power the air conditioner 1 at start up, it can also provide electricity otherwise. A power circuit as shown in FIG. 9 runs to a battery charger 36 which in turn can charge batteries 43 or can provide power to an exterior socket 46 for powering various power tools that might be used on a working cart such as the type envisioned here. The batteries 43 run a DC golf cart motor 30. A power directional control and rectifier 44 may be used to insure that power needed for the air conditioning unit 1 is not directed to the batteries 43 and also to convert AC current to DC current if necessary.

The invention could also be used with a gas or gas/electric cart. It would be preferable to have the generator 4 have a separate fuel tank 35 in order to prevent draining the fuel supply of the motor 30. This could be accomplished with a cut off switch or a gravity fed tube for fuel to the generator 4 from a common tank which tube was above a gravity feed from the common fuel tank for a gas cart drive motor which effectively provides a separate fuel source.

In order to allow the unit to be used inside or for power when the generator is off, the device includes a coiled battery charger input line 51 which allows power to be drawn from an exterior source. Power from the generator 4 or this input line 51 may go to a dual AC current receptacle 46 outside of the cart. A ground fault interrupter 47 can be present in the circuit to avoid power problems.

The air intake 6 for the generator 4 may have a bent line of travel through the insulation 9 to buffer the sound from the generator 4, although the majority of noise comes from the generator muffler 65.

A control panel 23 turns the generator on and off and controls the air conditioner 1. This may have a thermostat 33 inside the enclosure 59 to allow the temperature of the-cab to be controlled and to route power from the generator 4 to the various outlets for that power described above.

Figure 8:
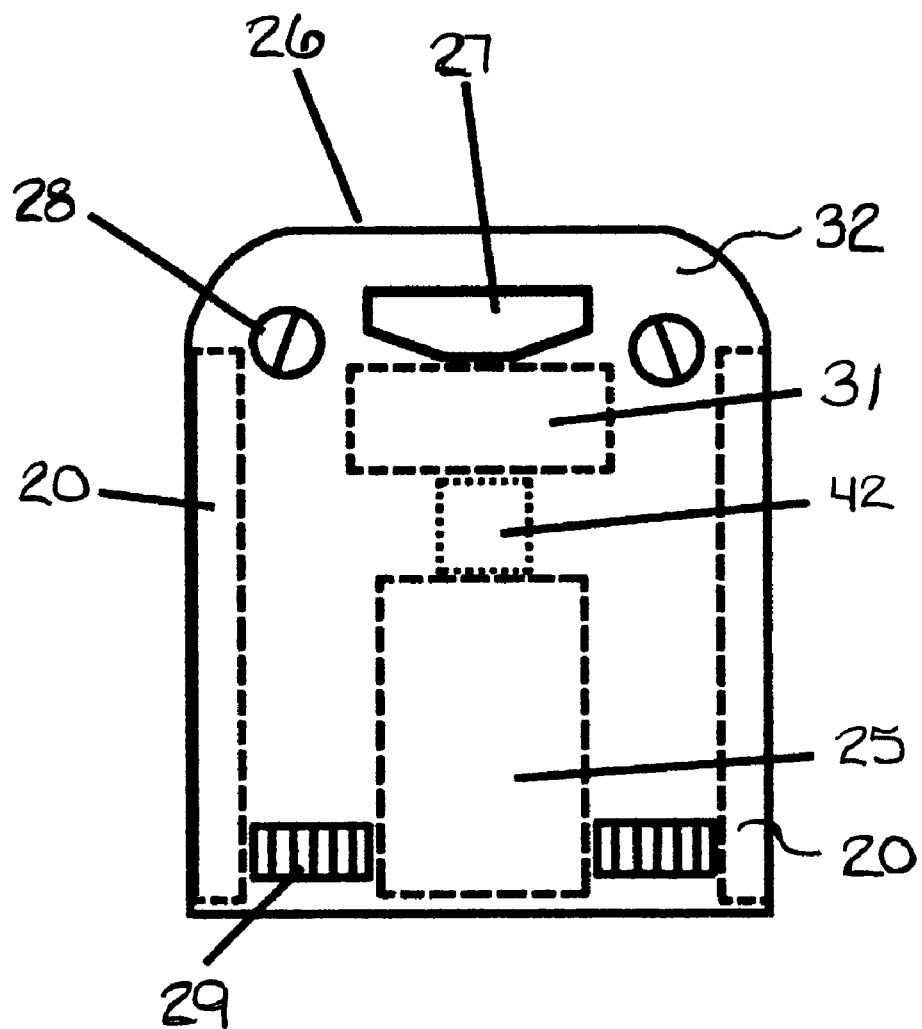
FIG. 8 shows a transparent view of the roof system shown in FIG. 7.

As shown in FIG. 8 air conditioner output ducts 20 and intake duct 31 may pass through the roof 2 and roof insulation 49 to reduce sound internally. Anterior output vents 28 and posterior output vents 29 insure air flow throughout the interior of the cart and receive air from output ducts 20 which receives cool air directly from the air conditioner 1. Air from the cart interior goes back to the air conditioner 1 through intake duct 31 so that interior air and not exterior air is cooled. A generator start/stop switch 24 may be present to control the generator 4.

While a cooling unit, air conditioner 1, is described, the air conditioner 1 can easily include or be replaced with, a heating unit at the same location in order to provide a heated cart enclosure 59.

In FIG. 1 the battery charger 36 also charges batteries 43 which run a motor which drives the wheels 60 of the cart 57. A separate set of batteries 43a may be used between the generator 4 and the air conditioning unit I as described in more detail below.

A separate fuel tank 35 delivers fuel either through a gravity feed mechanism if the fuel tank is on top or utilizing a fuel pump 34 if the fuel tank 35 is below the generator 4.

Electrical wires carrying power from and the vents carrying oxygen to the generator 4 and the exhaust from the generator housing 5 are passed through insulation 9.

A special holding bag rack 40 is attached to the rear of the cart 57 on either side of the pay load bed 53 in order to hold golf clubs in a club bag 80 when the cart 57 is used as a golf cart. The holding rack 40 has a support pan 21 to support the bag 80 at the bottom and a stabilizing bracket 22 above to hold it in place to the cart 57. A strap 50 also is available to hold the bag 80 in place.

Figure 2:
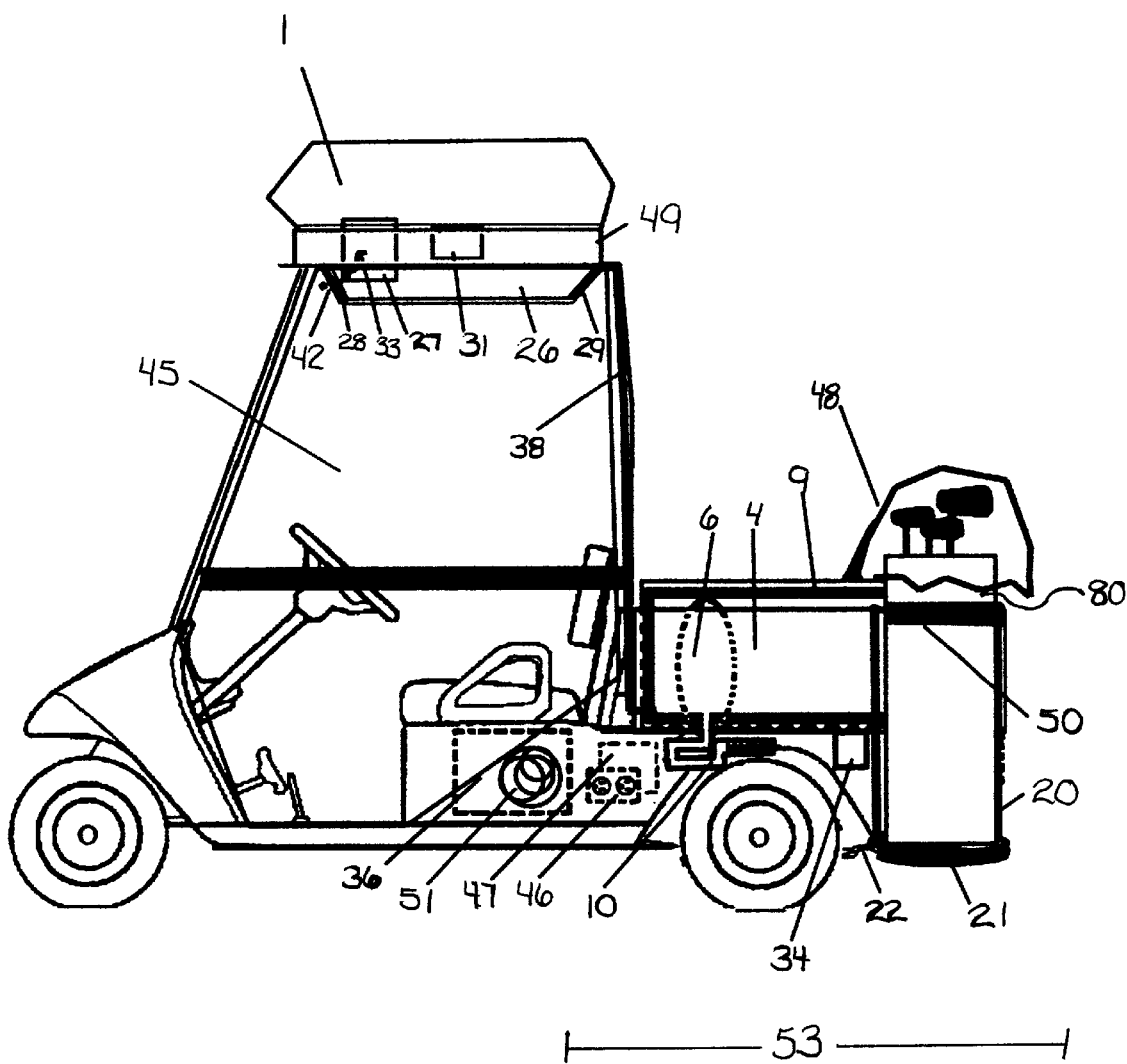
FIG. 2 shows the embodiment of FIG. 1 where a golf bag carrying improvement has been incorporated.
Figure 3:
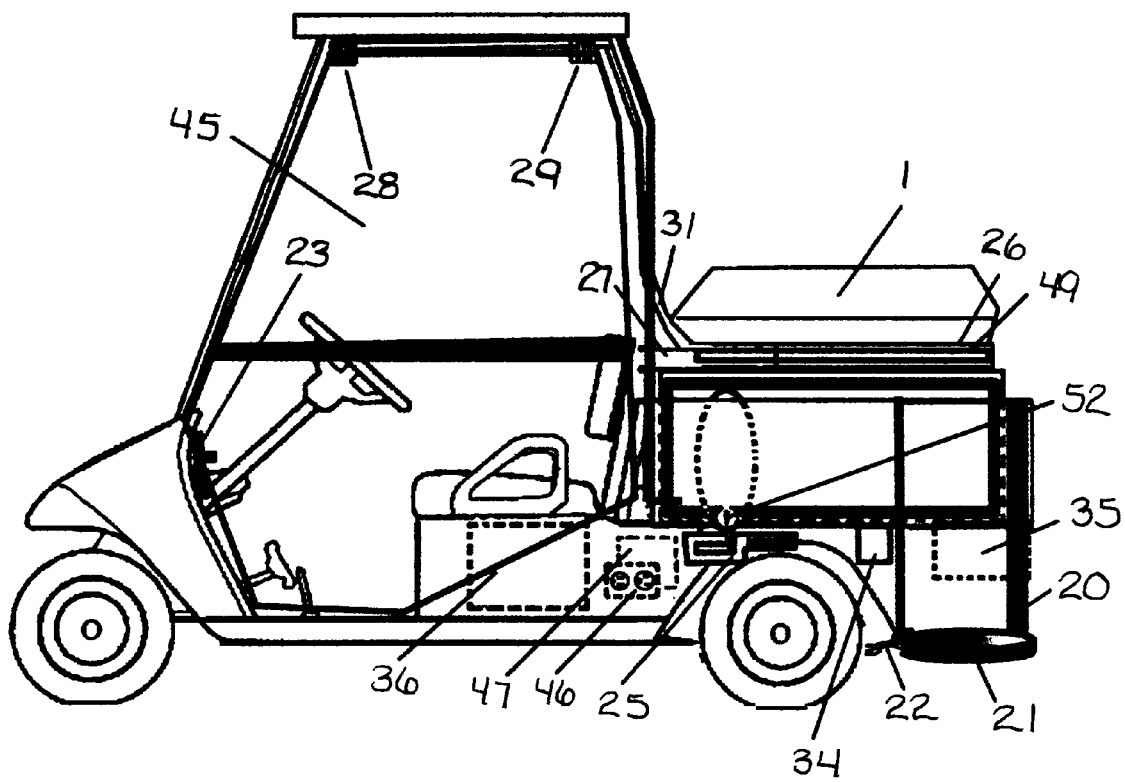
FIG. 3 shows an alternate layout for the air conditioning unit.
Figure 4:
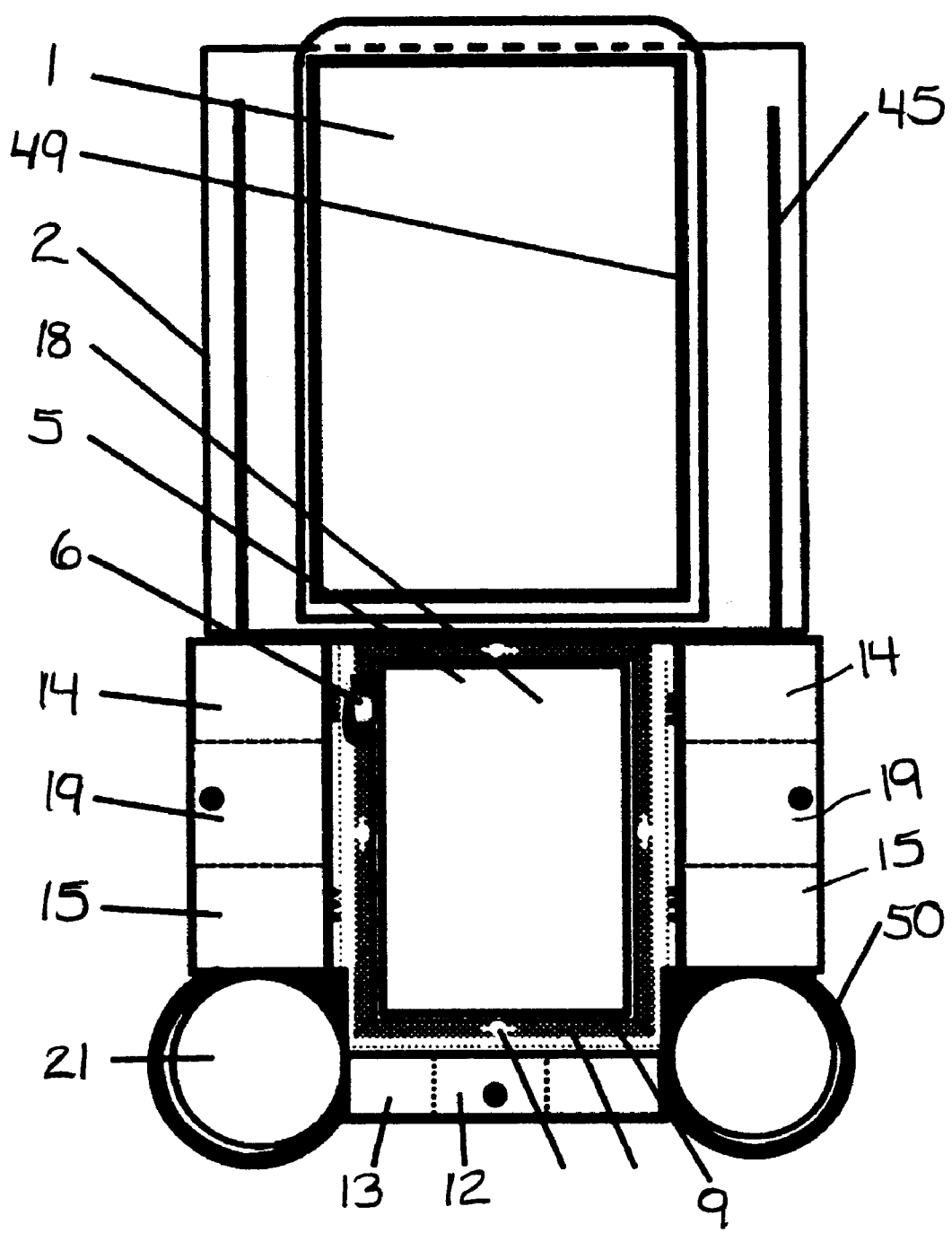
FIG. 4 shows a partially transparent view through the top of the embodiment shown in FIG. 1.
Figure 5:
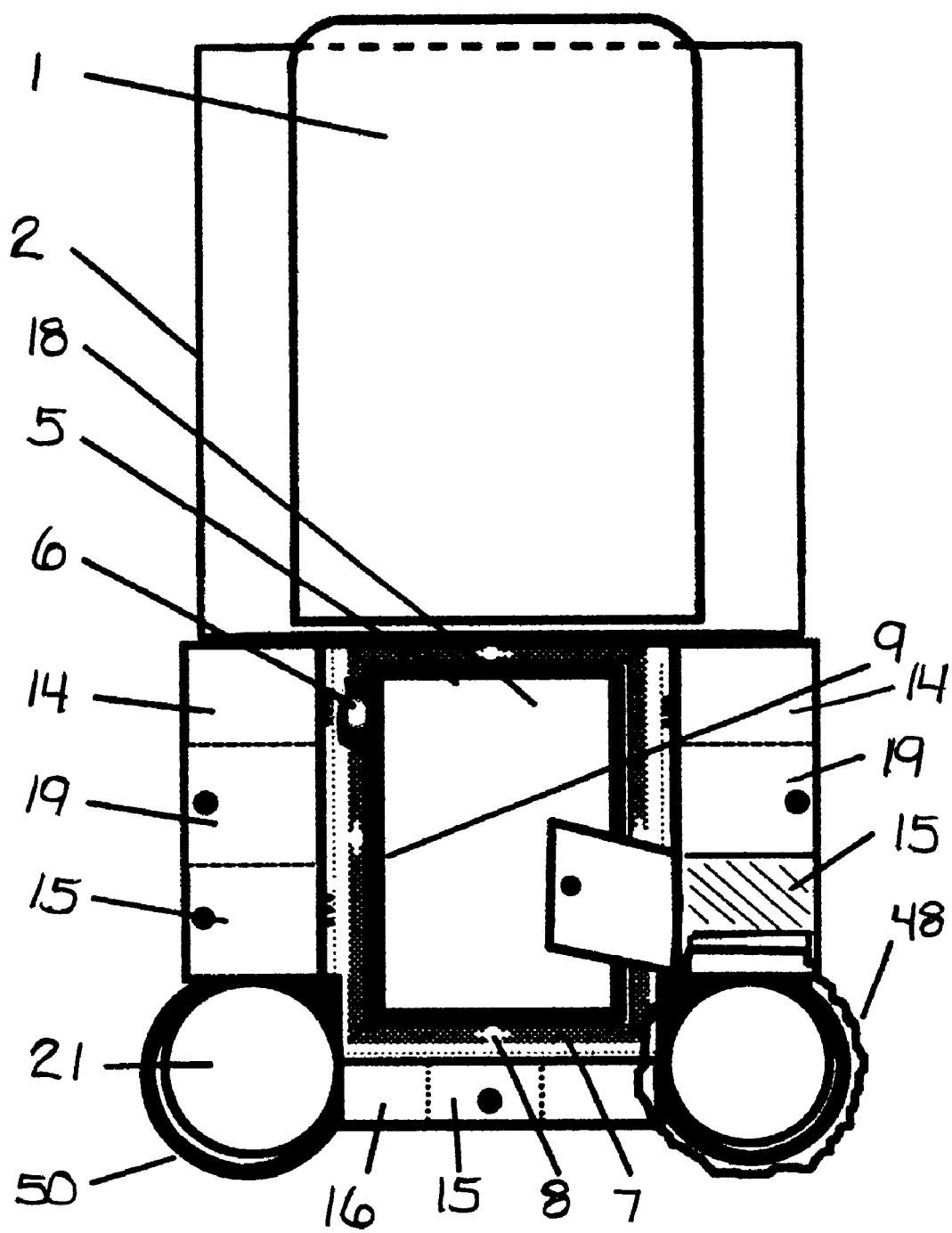
FIG. 5 shows a partially transparent view through the top of the embodiment shown in FIG. 2.
Figure 6:
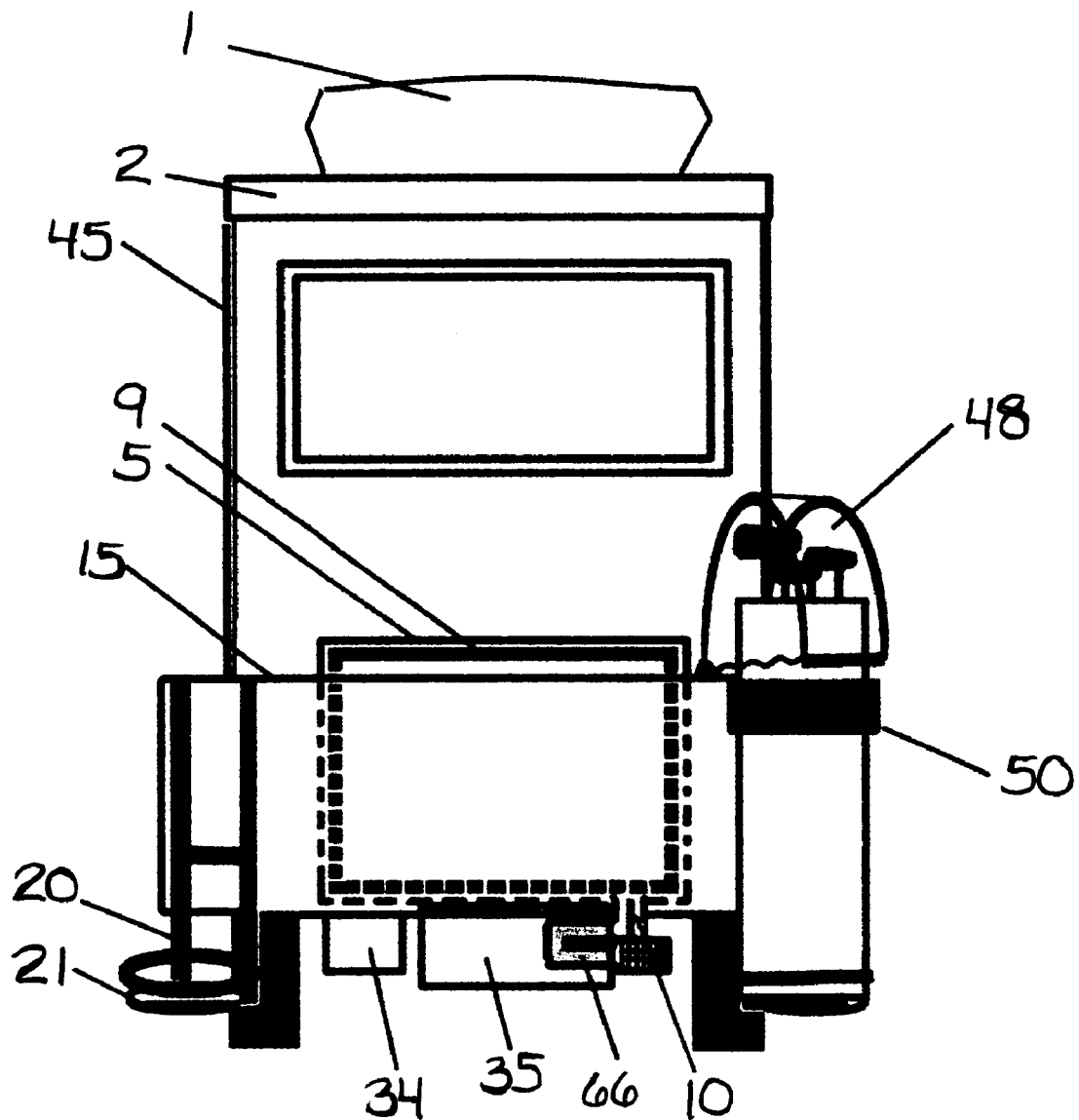
FIG. 6 shows a rear view of the embodiment shown in FIG. 2.
Figure 7:
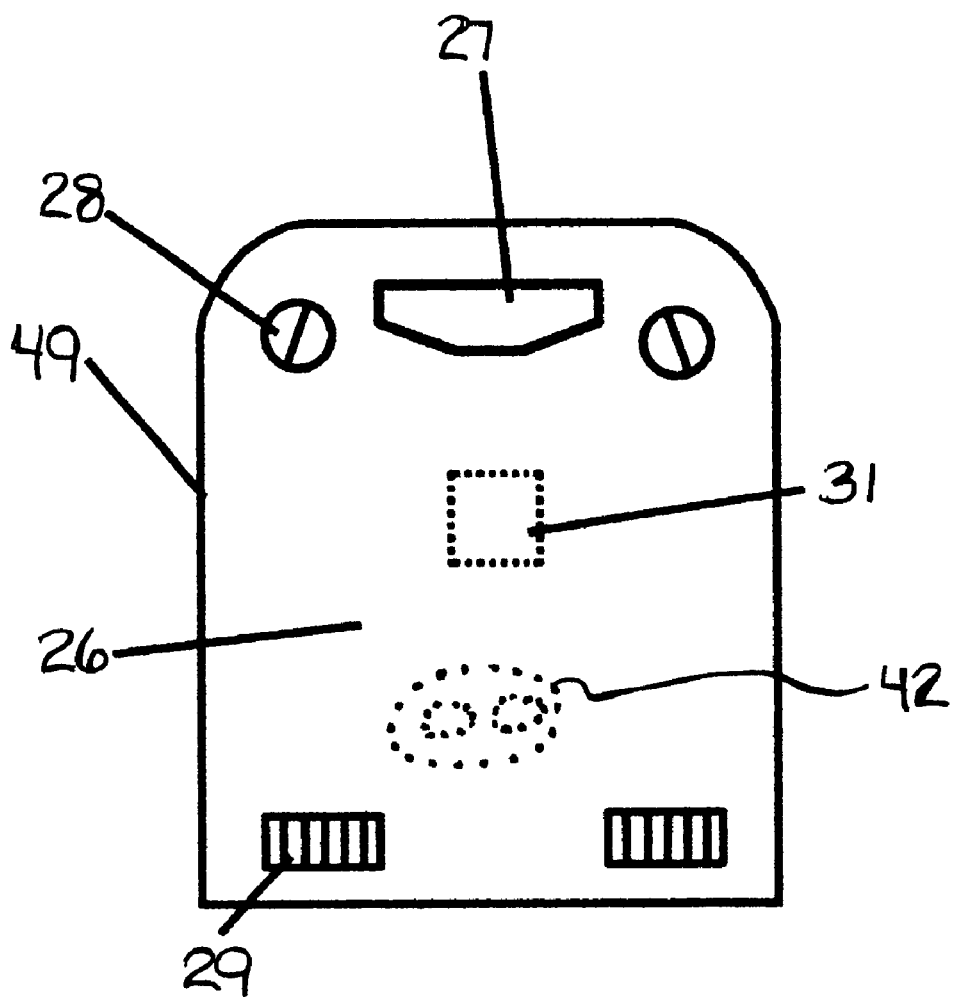
FIG. 7 shows a view of the roof of the cart shown in FIG. 1.

As shown in FIGS. 2 and 5, the bag rack 40 may describe a retractable cover 48 in a cover section 15 which allows for the golf clubs to be covered in the event of rain. This cover 48 may lock to the panel to discourage theft of the clubs.

The cart storage compartment has a rack for receiving a golf club bag adjacent to the storage compartment and a cover extendable from the compartment for covering the golf club bag. The cover and rack may lock around the golf bag to allow the clubs to remain on the cart and to discourage theft.

Also shown are sections available for first aid kits 12, sand bottles 14, miscellaneous tools 13, ice 17 (which may be an insulated section); a refrigerated section 18 powered by the generator 4; and a locking storage section 19. The air conditioning unit 1 may be placed directly above the generator 4 as shown in FIG. 10 to power the refrigerated section 18.

As can be seen by reference to FIG. 10, the golf cart power system may be shown alternatively where the cart has an interior 59 and an exterior around the interior 59 along with front 59a and a rear 59b and wheels 60 and defining a payload bed 53 between the rear wheels. There is a generator housing 5 containing a generator 4 located above the payload bed. This housing 5 may have insulation 9 and define an open vent 6 for air to the carburetor (not shown) and a muffler 65 within a baffle system 10 for muffling the noise from the exhaust 66 of the generator 4.

In this embodiment, there is an electric air-conditioner 1 located above the generator housing 5 connect-able (by way of an electrical plug 51) to the generator 4 so as to be powered by the generator 4. The generator 4 may have it's own fuel source internally or may receive fuel from a separate fuel tank 35 which may have a fuel pump 34 to send fuel to the generator 4 if necessary as shown in FIG. 11. The air conditioner 1 may have a sound insulated housing, but this is not considered necessary in the preferred embodiment.

The air conditioner 1 has an air intake 20 and an air output 31 continuous with the interior 59 and communicating with the interior 59 of the cart 59. In the typical arrangement, the output 31 is above the intake 20.

The passenger enclosure formed by the interior 59 has a roof 2 and a floor 59c and front 59a and back 59b, and the enclosure 59 is located directly in front of the intake 20 and output 31. The enclosure 59 defines a rear opening 27(a) for communicating with the intake 20. Above this rear opening 27 is a back duct 55 connected output to allow air to flow within the cart 57 as described in more detail below.

In the preferred alternative embodiment described herein, the generator 4 is a gas generator 4 having an internal combustion system having an exhaust 66 and the housing 5 further comprises a baffle means 10 connected to said exhaust 66 for reducing noise from the exhaust 66 said baffle means 10 being located below the enclosure 5 and opening below the payload bed 53. The baffle means 10 and muffler 65 comprises a system of tunnels 11 as shown in the side view in FIG. 15 and the cross section of FIG. 16 and shown in terms of placement in FIG. 10.

Figure 16:
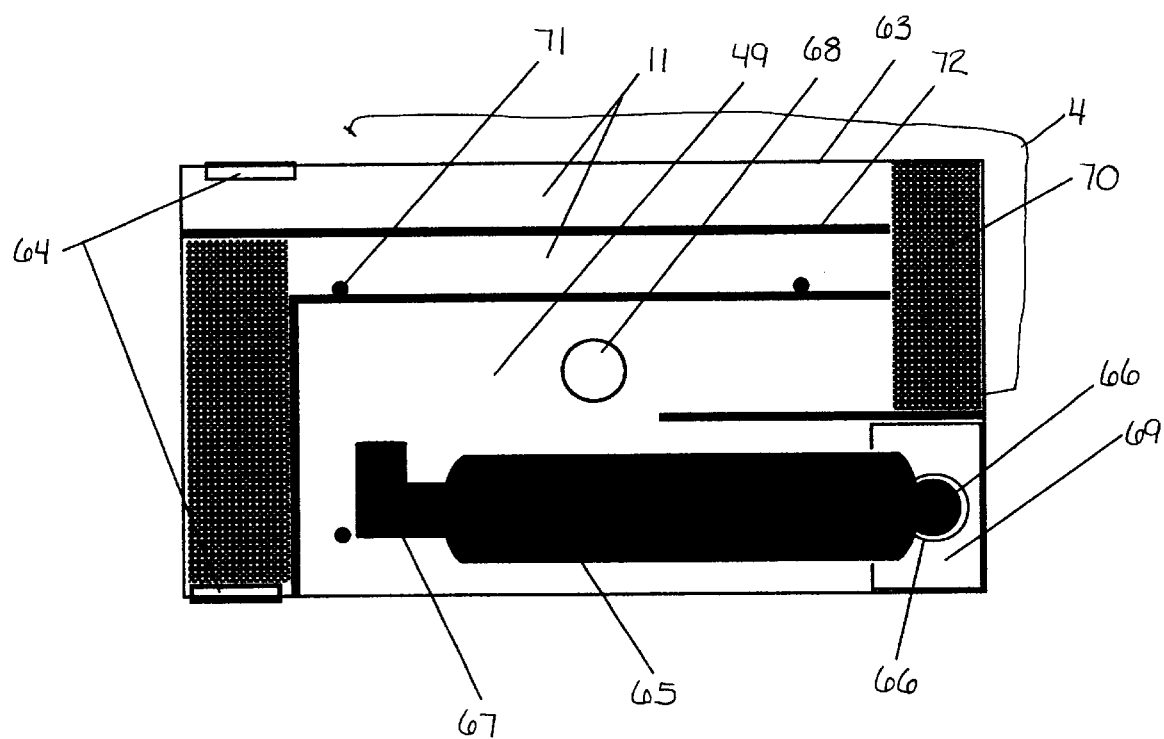
FIG. 16 shows a top view of the baffle system of FIG. 15.

The baffle system 10 shown in FIGS. 15 and 16 is comprised of a series of tunnels 11 separated by aluminum tunnel walls 72 and mesh aluminum baffles or screens 70 to reduce sound from the generator 4. The generator 4 may have it's own muffler 65 which fits within a chamber 73 within the baffle system 10. The generator exhaust 66 is attached to the generator muffler 65 which ends in the generator muffler exit 67. After the sound is reduced in the tunnels 11, the air exits the baffle system 10 through discharge slits 64.

Insulation may coat the interior of he aluminum housing 63. The generator 4 sits atop this baffle system 10 and receives air through air intake vents 6 in the housing 5 of the generator 4.

Figure 20:
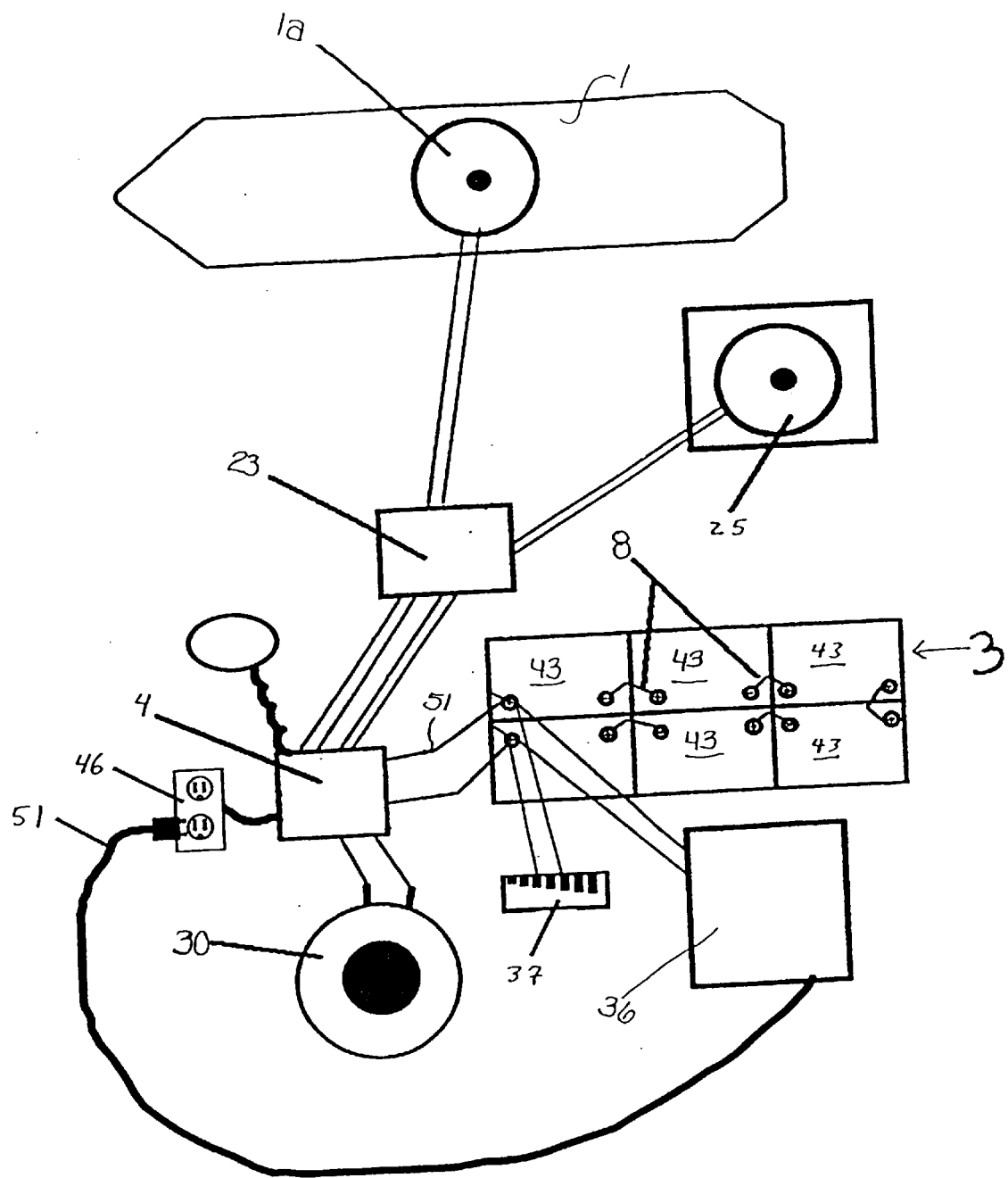
FIG. 20 shows an alternative electrical diagram having a charge indicator.
Figure 21:
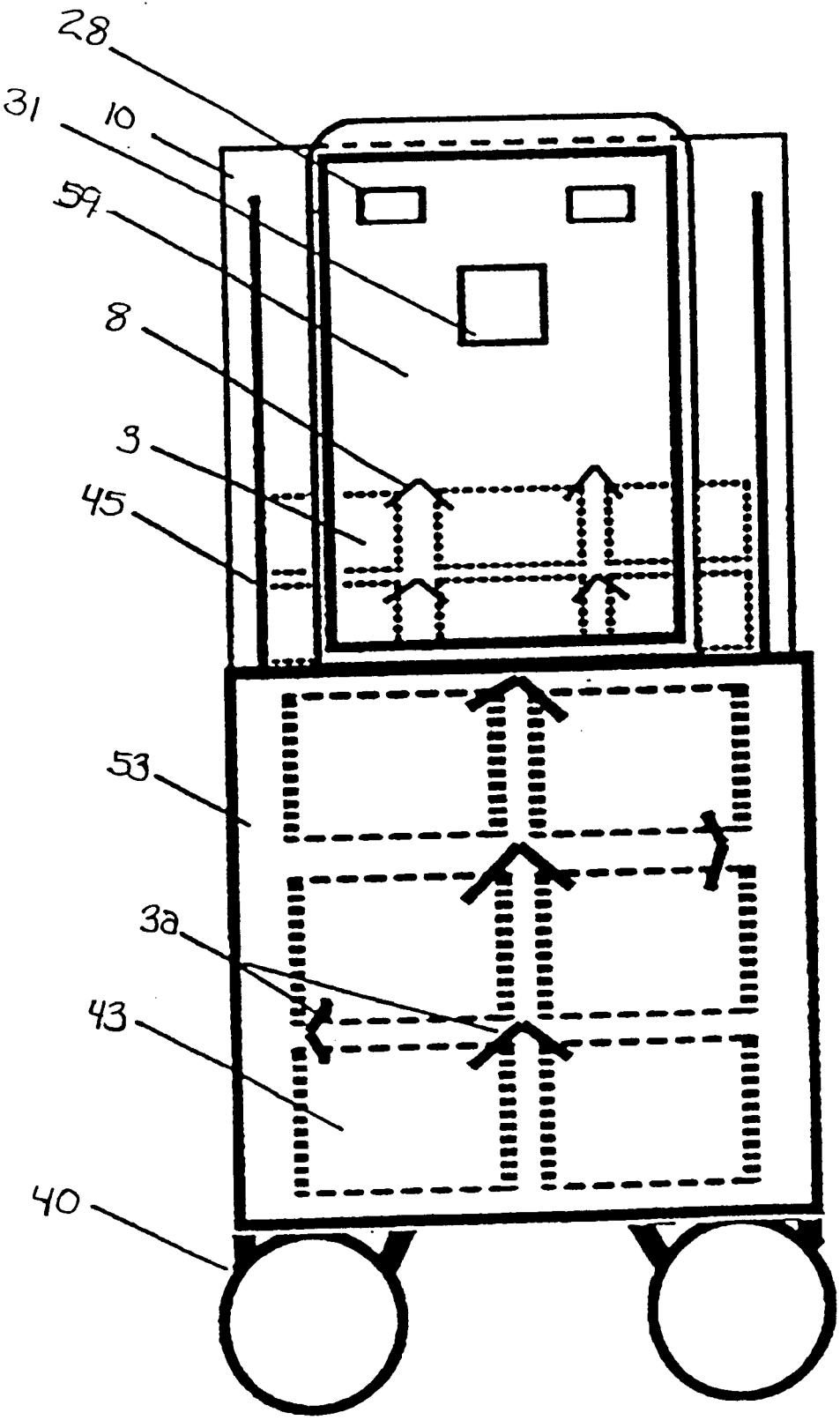
FIG. 21 shows a layout of the unit having a separate set of batteries for the drive from the air conditioner batteries.
Figure 22:
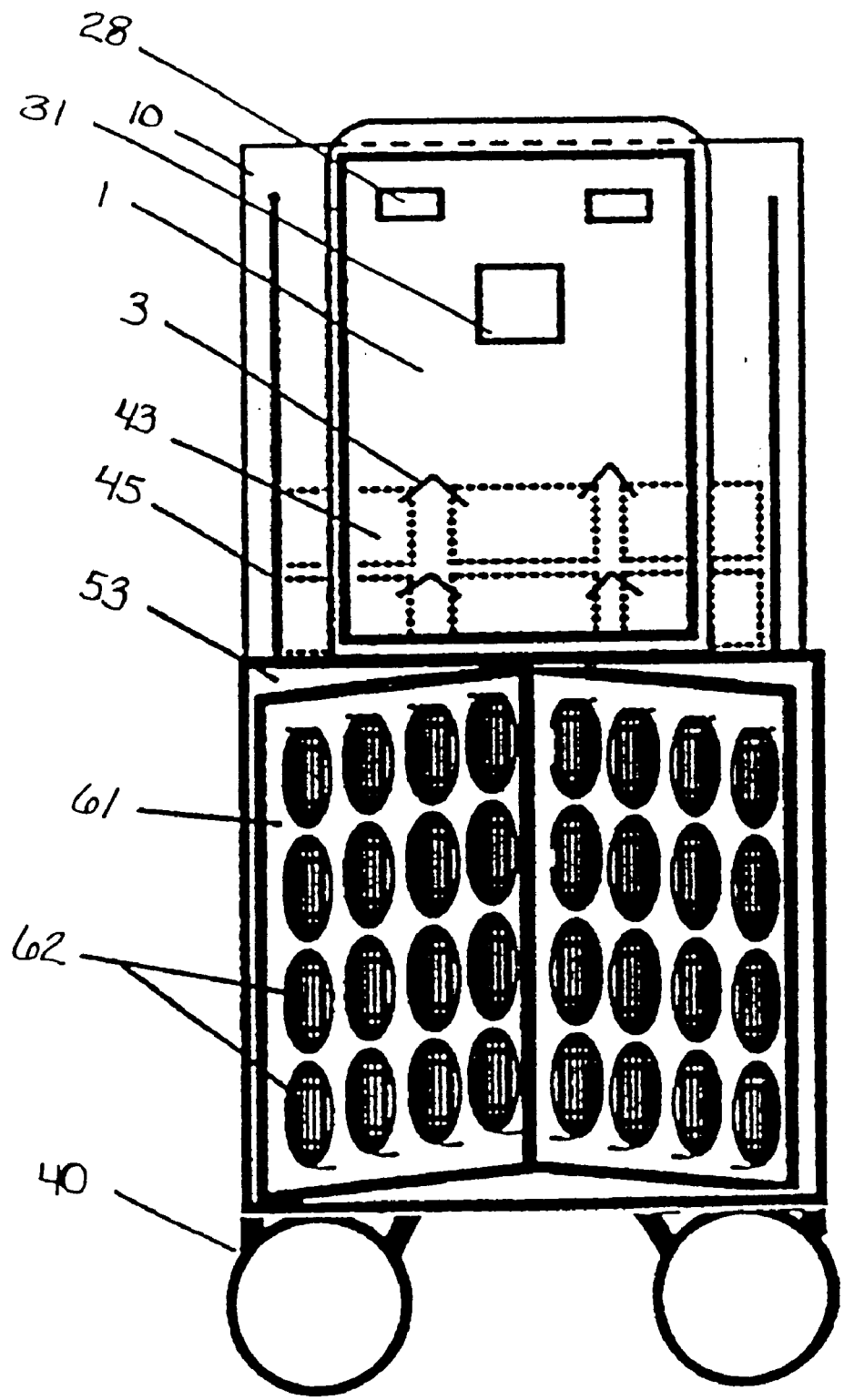
FIG. 22 shows a top view of solar panels over the batteries shown in FIG. 21.
Figure 23:
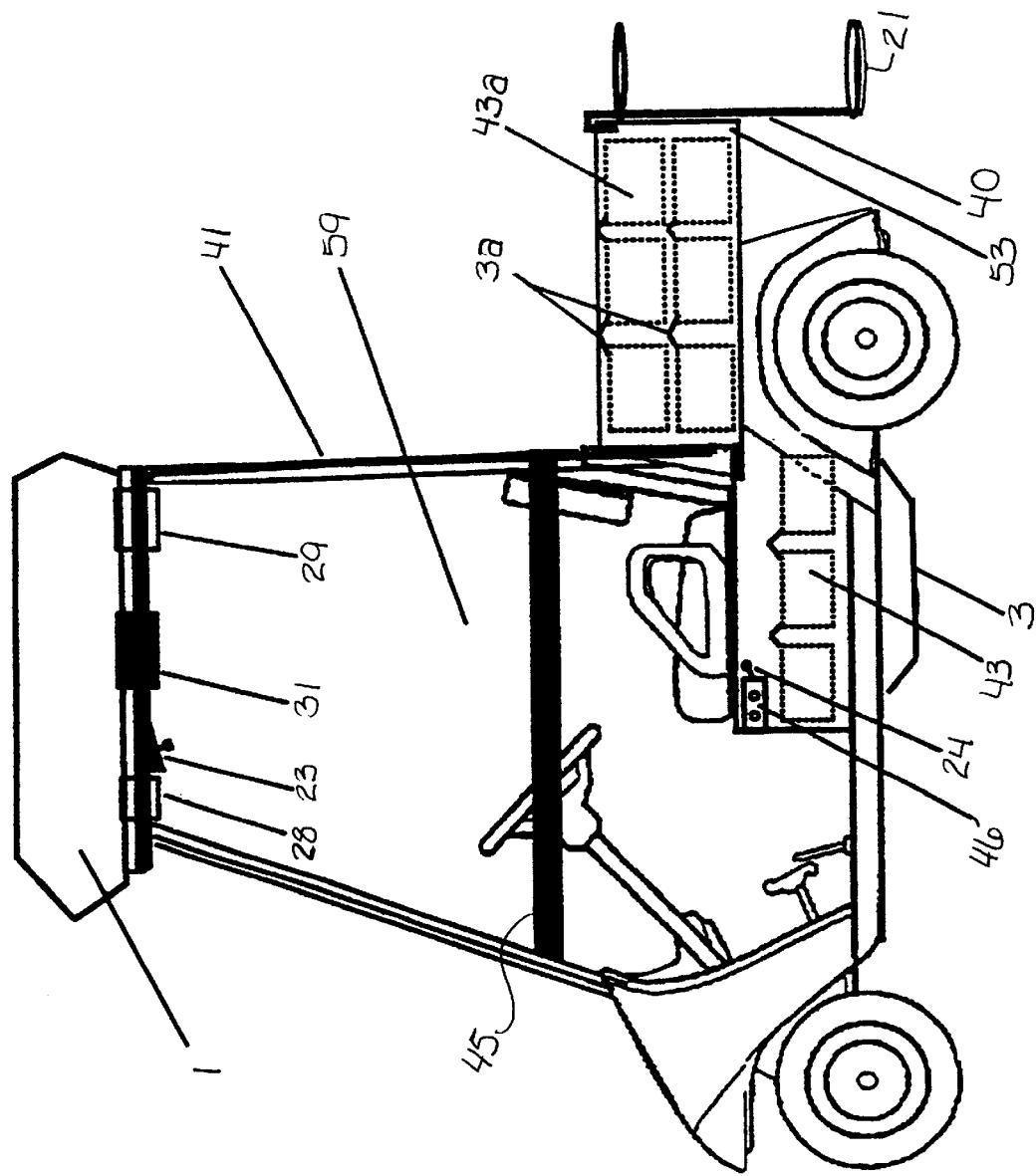
FIG. 23 shows a side view of the view shown in FIG. 21.
Figure 24:
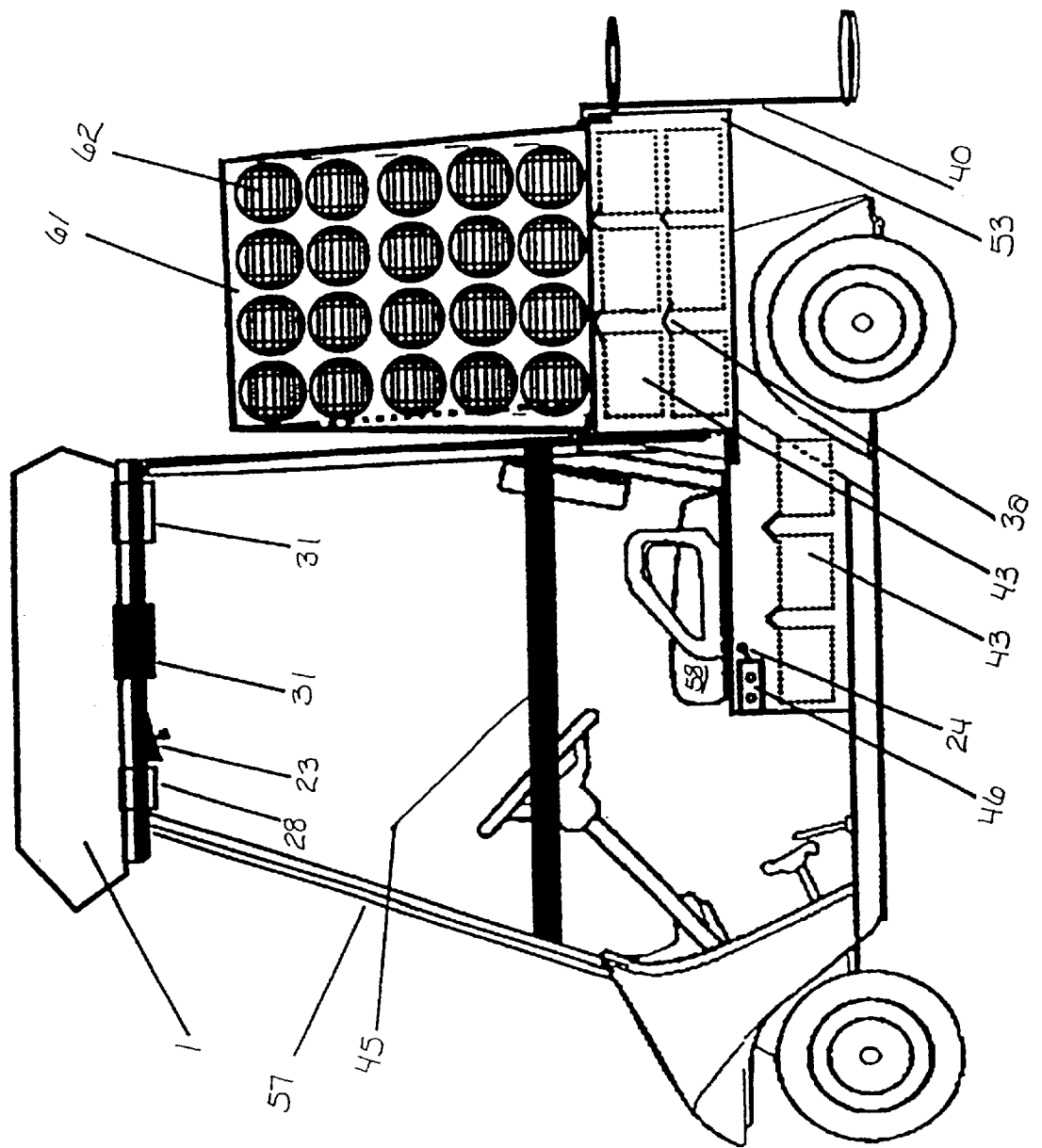
FIG. 24 shows a side view of the view shown in FIG. 22.
Figure 25:
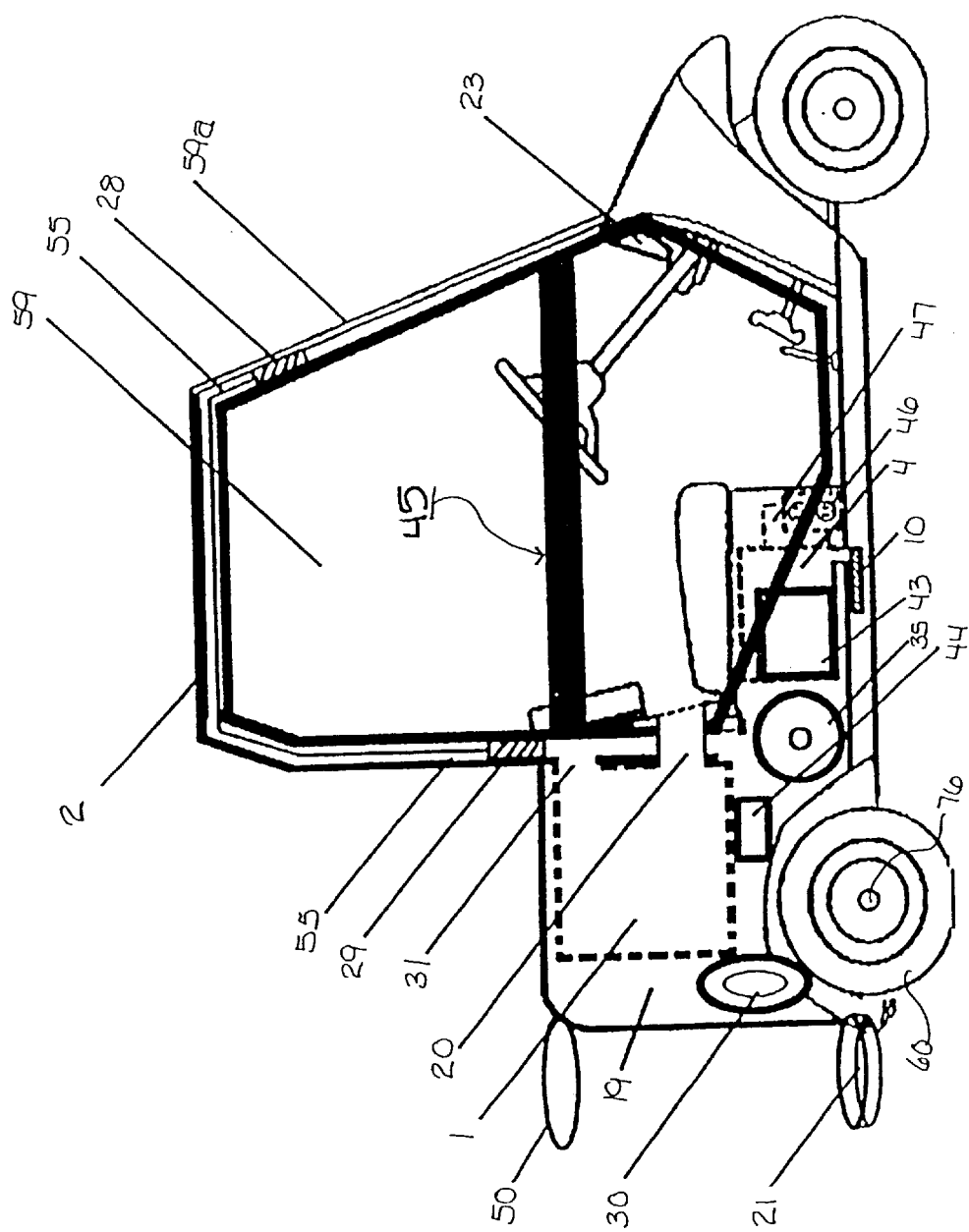
FIG. 25 shows a side view of an alternative layout for the generator where the generator is in place under the seats of the enclosure.

As can best be seen by reference to FIGS. 9 and 17–20 a number of circuits may be defined by the novel arrangement of components described herein. Referring for the moment to FIG. 20, an electric motor 30 is functionally connected to the wheels 60 (as shown in FIGS. 10 and 11, the details being known in the art) so as to provide power to the wheels 60 and move the cart 57.

At least one battery 43 (preferably a cluster 3) is connected to the motor 30 where there is an electric motor 30 for powering the cart 57 as is taught in the preferred embodiment. A battery charger 36 is connected between the battery cluster 3 and the generator 4 for charging the battery cluster 3 from the generator 4. The cart 57 also has a charge indicator means 37 for indicating when the change in the cluster 3 drops below a certain level. This may alert the user or have an automatic circuit 44 for providing power to the batteries 43 from the generator 4 when the battery charge drops below a certain predetermined level.

The cart 57 in this electrical layout has at least one socket 46 attached to the golf cart exterior and functionally connected between either the battery cluster 3 or generator 4 (or both) so as to allow for power from the generator 4 to be accessed by tools exterior to the cart 57.

Since the generator power requirements of the air conditioner 1 drop exponentially after overcoming the start-up power requirements of the air conditioner 1, the generator 4 may be relatively small and still provide power to the power socket 46, the recharger, the battery cluster 3 or to run the air conditioner 1 although there may need to be an electrical shunt to cut off charge to the batteries 43 when the air conditioner 1 starts up or is a high energy mode.

Also shown in FIG. 20 is a separate auxiliary blower 25 and misting device 42. This is optional. A misting device 42 can increase the evaporation by increasing moisture within the enclosure 59 of cart 57 to enhance the effective cooling of the air conditioning unit 1. This blower 25 would allow for the air from the air conditioner 1 to be put under greater pressure than would otherwise be provided by the blower motor internal to the air conditioner 1. The mist from the misting device 42 may or may not be a part of the air from the vents 28 and 29 or bin in proximity thereto, and may be separately introduced into the cart interior 59 separately. This would be preferable where the ducts 55 run to the bottom 59c or front 59a of the cart 57 and misting would preferably come from the roof 2.

A control panel 23 may shunt power to the various electrical units described herein and may be located anywhere convenient to the users.

Referring back to FIGS. 10–14 the cart 57 also has a back duct system comprised of a back duct receiving chamber 55 and a distribution system comprised of channels 16 running through insulation 32 which is here shown within a roof duct housing 26. This may also discharge from the sides, floor, center or front of the cart 57. The receiving chamber 55 runs along the back 57b of the enclosure from the air output 31 of the air conditioner 1 to the roof 2 of the enclosure. The roof duct system defines anterior 28 and posterior vents 29 opening into the left and right sides the interior 59 of the enclosure for distributing air from the air conditioner evenly into the enclosure 59. This is important since the high exchange with the exterior requires a high dispersion rate to be effective.

The misting means 42 and blower 25 may be attached together with the blower 25 behind the misting means 42 to the roof 2 or to the roof duct housing 26 for placing moisture into the air along with increased air flow from the air conditioner 1.

Figure 26:
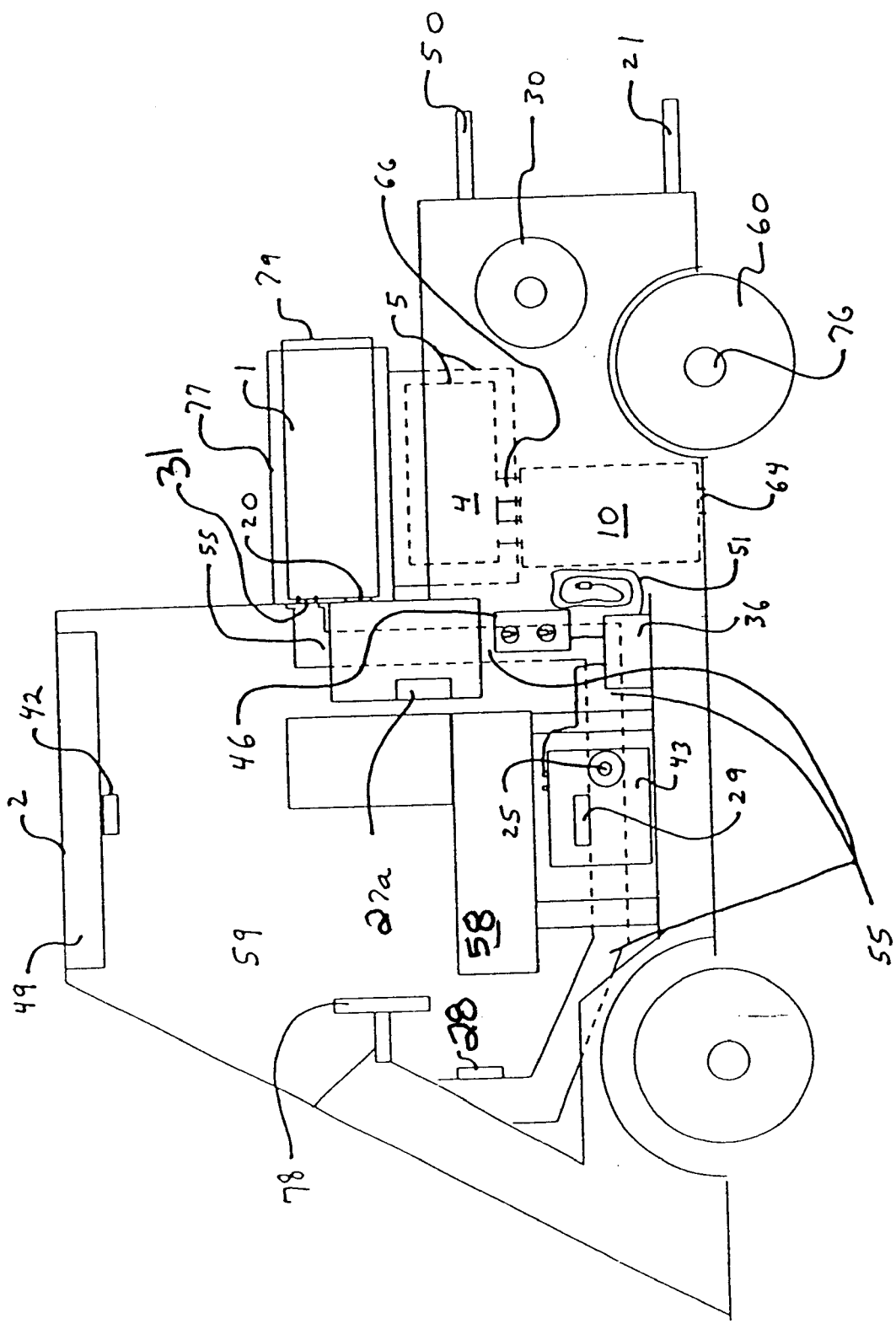
FIG. 26 shows an alternative view showing a layout of all of the electrical components relative to their placement in the cart in the preferred embodiment having side and front posterior and anterior vents respectively along with a top misting means.

The cart 57 of this embodiment may, alternatively comprise a back duct means 55 running between the back 59b of the enclosure from the air output 31 of the air conditioner 1 to the front 59a of the enclosure and a front duct means defining openings into the interior of the enclosure 59 running along the front of the enclosure for distributing air from the air conditioner 1 into the enclosure 59. This arrangement would change the description only by replacing the roof duct system with front or side ducts to accomplish the same purpose as shown in FIG. 26.

The duct system also provides a air conditioner intake duct 74 which allows a space 74a though which the filter (not shown) of the air conditioner may be serviced. This intake duct 74 is open to the interior 59 through opening 27a so that air from the interior 59 may be drawn into the air conditioner intake 21.

As shown in FIG. 13, the back ducts 55 run on either side of the space 74a in the intake duct 74 so as not to interfere with access to the air conditioner intake 20 which is typically covered by a filter. While two back ducts 55 are shown, only one side may be utilized depending on the cooling or heating capabilities and requirements.

As can be seen by reference to FIGS. 9 and 17–20, depending on the type of second fuel source for the air conditioning 1, it may be from the group comprised of a gas powered generator 4 fed from a fuel tank, or an electric generator powered by solar cells 62, compressed air 81, a second set of batteries 3a or a combination of these units.

Figure 17:
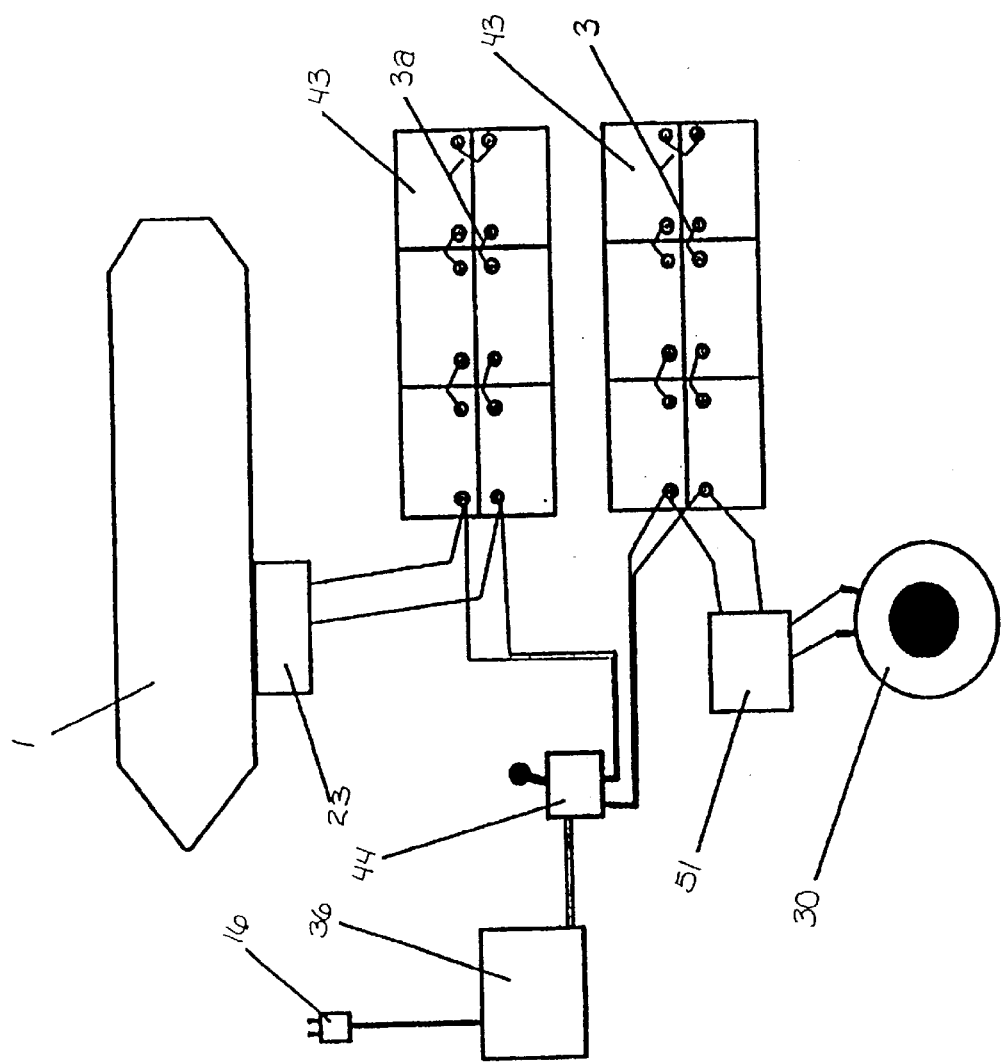
FIG. 17 shows an electrical diagram showing two sets of batteries, one for the air conditioner and one for the cart motor.

The cart 57 may include selector means, here a charger directional control 44, for providing power from the second power supply usually generator 4 to at least one air conditioning battery cluster 3a or to the drive battery cluster 3 as shown in FIG. 17.

Figure 18:
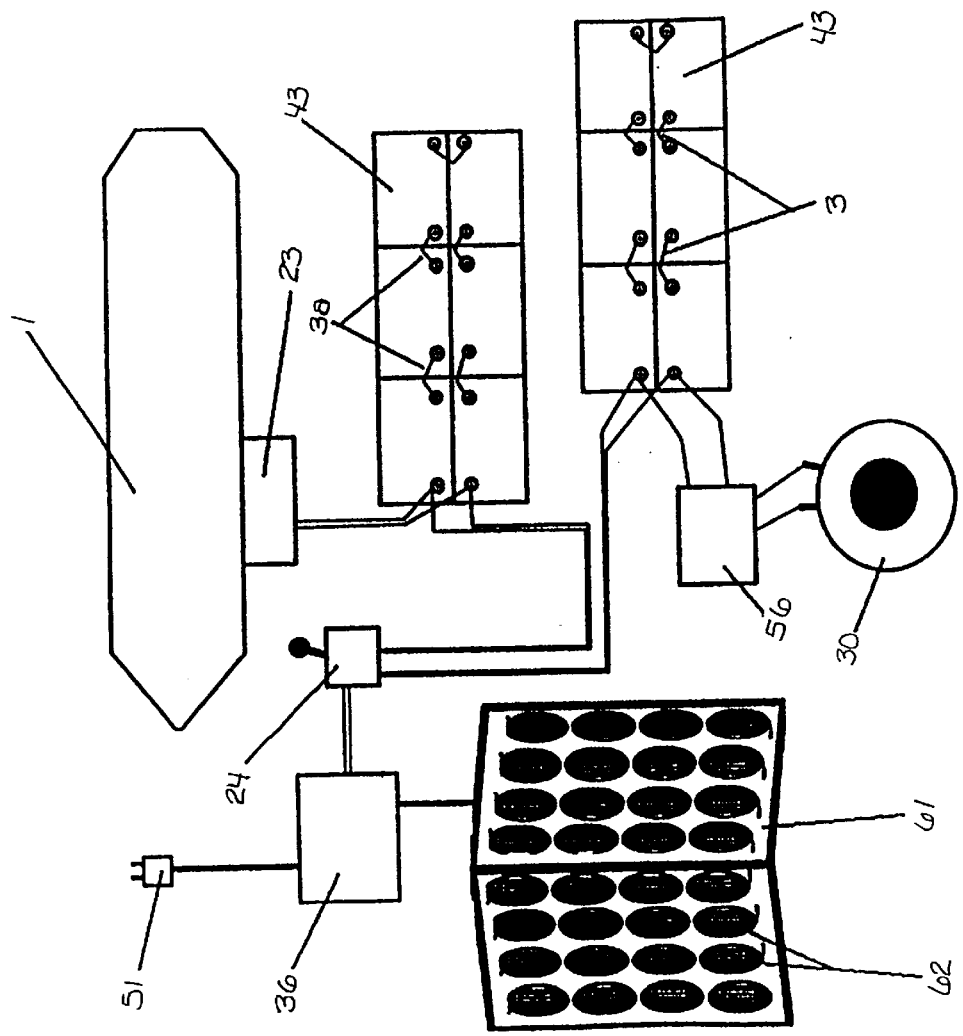
FIG. 18 shows an electrical diagram for a cart having two sets of batteries using solar cells.
Figure 19:
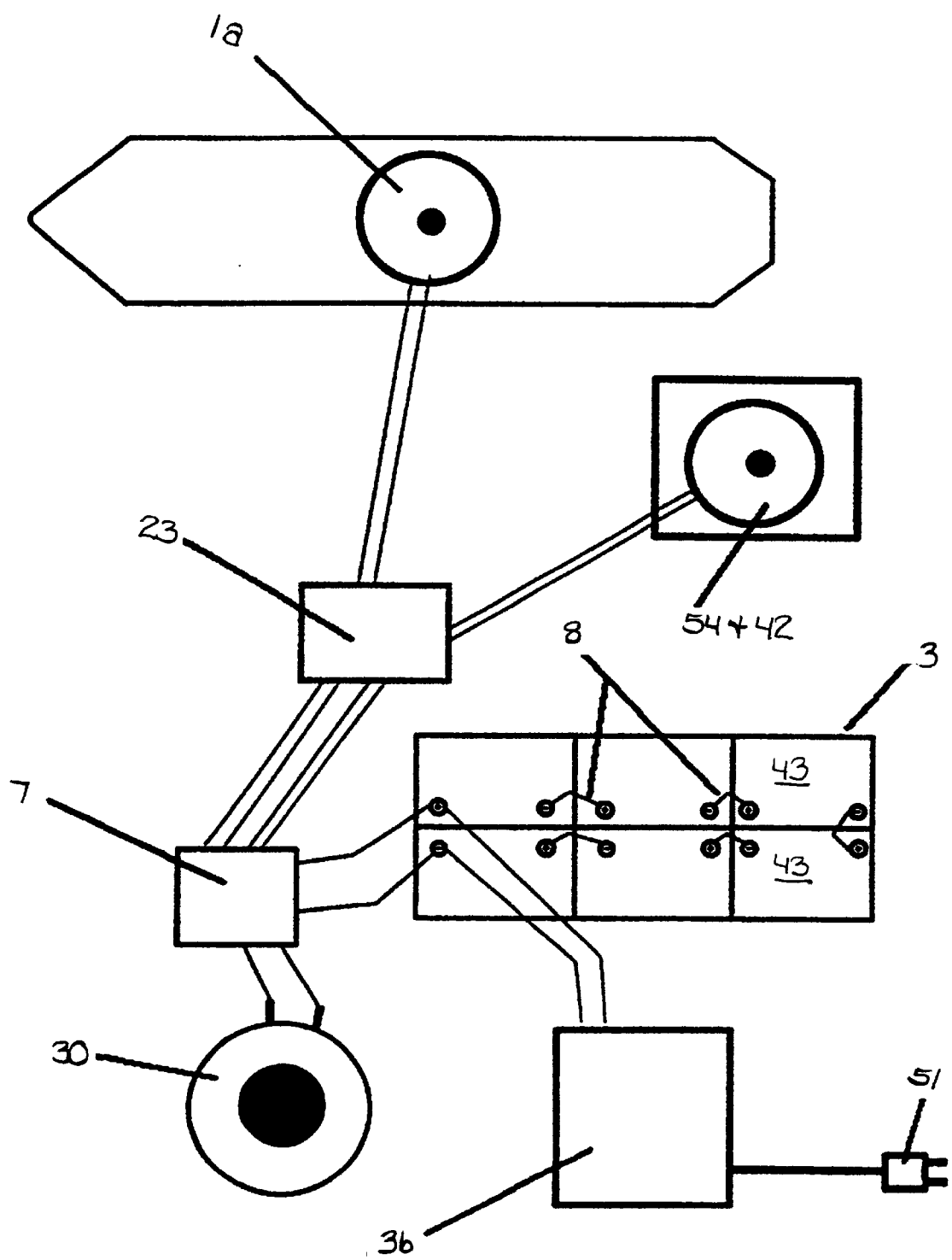
FIG. 19 shows an electrical diagram for the unit with a separate blower and sprayer.

As shown in FIG. 18, the battery charger 36 may have an external hookup 51 to allow the batteries 43 and external socket 46 to be powered from a normal electrical socket line 51.

While the air conditioner is used herein to generally refer to mechanical air conditioning units, it is also envisioned that heating units or dual cooling and heating units would be within the concept embodied herein.

FIG. 26 shows an alternative where the misting means 42 is on the roof 2 and the anterior vents 28 mounted in front of the user below the steering wheel 78 and the posterior vents 29 beside the seat 58.

The back duct 55 runs down from the air conditioner output 31. The air conditioner return 20 still receives air from behind the seat 58 through duct 27a.

A bottom auxiliary blower 25 increases the air flow within the back duct 55 so that adequate circulation is assured.

In this embodiment, the air conditioner 1 is within sound insulated air conditioning housing 77 to reduce noise. This housing 77 is open to allow the air conditioning vent 79 to vent heat to the outside.

Water may go into an area in the cart roof insulation 49 to feed the sprayer or misting means 42. The misting means 42 may be powered by the batteries such as batteries 43. It may be setup to introduce water into the enclosure automatically when the moisture level drops below a certain level using sensors or it may spray mist into the enclosure when the drivers' side door closes.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

What is claimed is:

1. A cart having a center between the top and bottom of the cart comprising:
   a) a four wheel base having a front and a rear and a top and a bottom;
   b) an interior compartment having a top and a bottom and having a seating area having a front and a rear for one row of seating at the front of the base with the seating area front being located facing the front of the base;
   c) a motor for driving the cart;
   d) a drive means for propelling the cart;
   e) a first fuel source for fueling the drive means;
   f) a cargo area between the interior compartment and the rear of the base;
   g) an air conditioning system comprised of a muffler system located in the cargo area at the top of the base with a vent through the base to the bottom of the base; a generator means for generating electrical current located adjacent to a muffler means for muffling sound from a motor having an exhaust gas, said muffler means having an exhaust duct functionally connected to the muffler means; a second fuel source functionally connected to the generator means; an electrical mechanical temperature controlling means for cooling or heating the interior compartment functionally connected to the generator means.

2. The cart of claim 1 wherein the controlling means comprises a mechanical air conditioner having evaporative cooling within a system of coils.

3. The cart of claim 1 wherein the muffler system further comprises a sound insulated container enclosing the generator means.

4. The cart of claim 3 wherein the generator means further comprises a muffler and wherein the sound insulated container further comprises a chamber for receiving the muffler and at least one baffle means having a first end and a second end, said first end open to the chamber and said second end open to the vent for receiving the exhaust and reducing the sound.

5. The cart of claim 4 wherein the generator means further comprises a power receptacle external to the insulated container and powered by the generator means.

6. The cart of claim 5 wherein the generator means further comprise a power diverter means for selectively diverting power from the generator means away from the power receptacle when the controlling means requires more power or away from the controlling means when the power receptacle requires more power.

7. The cart of claim 5 wherein the first fuel source further comprises at least one battery connected to the drive means and wherein the drive means comprises an electric motor.

8. The cart of claim 7 wherein the generator means further comprises a gas powered generator and wherein the second fuel source comprises a gas reservoir connected to the generator means.

9. The cart of claim 7 wherein the cart further comprises:
   a) a battery charger means connected between the power receptacle and the battery for charging the battery from the generator.

10. The cart of claim 9 wherein the generator means for generating electrical current having a second fuel source which does not deplete the first fuel source comprises a generator powered by the motor functionally connected to at least one battery means for holding a charge from the generator and further comprising a charge indicator means for providing power to the at least one battery from the generator when the battery charge drops below a certain level.

11. The cart of claim 4 wherein the baffle means further comprises at least one chamber partially separated by at least one wall to create two portions to the chamber so that the exhaust is channeled between the two portions of the chamber.

12. The cart of claim 11 wherein the baffle means further comprises a plurality of tunnels twisting through the sound insulated container from the generator muffler exhaust to the vent.

13. The cart of claim 1 wherein the controlling means further comprises a fan and an air intake and air exhaust functionally connected to the fan to draw air into the intake and blow air from the exhaust and wherein the controlling means is positioned so that the air intake communicates with the interior compartment at the rear of the seating and further comprising a duct means for distributing air from the air conditioner to the front and rear of the cart interior.

14. The cart of claim 13 further comprising a back duct means running along the back of the compartment from the air output of the air conditioner to the roof of the compartment and a roof duct means defining openings into the interior of the compartment running along the roof of the compartment for distributing air from the air conditioner into the compartment.

* * * * *